(12) United States Patent
Shen et al.

(10) Patent No.: US 9,319,901 B2
(45) Date of Patent: Apr. 19, 2016

(54) METHODS AND APPARATUS FOR PARAMETER SELECTION AND CONFLICT RESOLUTION FOR MULTIPLE RADIO ACCESS TECHNOLOGIES

(71) Applicant: QUALCOMM Incorporated, San Diego, CA (US)

(72) Inventors: Cong Shen, San Diego, CA (US); Farhad Meshkati, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/212,560

(22) Filed: Mar. 14, 2014

(65) Prior Publication Data

US 2015/0065144 A1 Mar. 5, 2015

Related U.S. Application Data

(60) Provisional application No. 61/873,546, filed on Sep. 4, 2013.

(51) Int. Cl.
*H04W 36/00* (2009.01)
*H04W 24/02* (2009.01)
(Continued)

(52) U.S. Cl.
CPC .......... *H04W 24/02* (2013.01); *H04W 72/1215* (2013.01); *H04W 84/045* (2013.01); *H04W 88/10* (2013.01)

(58) Field of Classification Search
CPC ..... H04W 88/06; H04W 24/02; H04W 16/14; H04W 72/02; H04W 72/1215; H04W 88/10; H04W 36/0066; H04W 72/082; H04W 84/045
See application file for complete search history.

(56) References Cited

U.S. PATENT DOCUMENTS 8,494,580 B1 7/2013 Weinrib et al.
2010/0099412 A1* 4/2010 Ramachandran et al. . 455/435.2
(Continued)

FOREIGN PATENT DOCUMENTS

| EP | 2 405 700 A1 | 1/2012 |
|---|---|---|
| WO | WO-96/29832 A1 | 9/1996 |
| WO | WO-2012/024422 A1 | 2/2012 |

OTHER PUBLICATIONS

International Search Report and Written Opinion—PCT/US2014/053294—ISA/EPO—Nov. 6, 2014. (13 total pages).
(Continued)

*Primary Examiner* — Ajit Patel
(74) *Attorney, Agent, or Firm* — Arent Fox LLP

(57) ABSTRACT

Methods and apparatus for communication comprise selecting a first parameter value for a first RAT transmission-related parameter from a first set of selectable first parameter values and a second parameter value for a second RAT transmission-related parameter from a second set of selectable second parameter values based at least in part on a mapping function that maps between ones of the first set of selectable first parameter values for the first RAT transmission-related parameter and the second set of selectable second parameter values for the second RAT transmission-related parameter. Moreover, the methods and apparatus comprise communicating using at least one of the first parameter value of the first RAT transmission-related parameter for the first RAT and the second parameter value of the second RAT transmission-related parameter for the second RAT.

18 Claims, 11 Drawing Sheets

(51) Int. Cl.
*H04W 72/12* (2009.01)
*H04W 88/10* (2009.01)
*H04W 84/04* (2009.01)

(56) References Cited

U.S. PATENT DOCUMENTS

| | | | |
|---|---|---|---|
| 2011/0207490 A1* | 8/2011 | Lee et al. | 455/509 |
| 2011/0237246 A1 | 9/2011 | Sen | |
| 2012/0309440 A1* | 12/2012 | Orjmark et al. | 455/509 |
| 2012/0322447 A1 | 12/2012 | Ramachandran et al. | |
| 2013/0065533 A1 | 3/2013 | Cai et al. | |
| 2013/0070656 A1* | 3/2013 | Chin et al. | 370/311 |
| 2013/0142116 A1 | 6/2013 | Prakash et al. | |

OTHER PUBLICATIONS

Automatic Neighbour Relation in LTE, LteWorld in Blog, 3GPP, 2G, ANR, NR, 3G, LTE, Apr. 20, 2010.

Jan Oppolzer et al., "Cell Identifier Assignment in Two-tier Femtocell Networks", Department of Telecommunication Engineering, 2013.

Fang Jianmin, Standardization Progress of SON in 3GPP, ZTE Corporation, Sep. 9, 2010.

* cited by examiner

METHODS AND APPARATUS FOR PARAMETER SELECTION AND CONFLICT RESOLUTION FOR MULTIPLE RADIO ACCESS TECHNOLOGIES

CLAIM OF PRIORITY UNDER 35 U.S.C. §119

The present application for patent claims priority to Provisional Application No. 61/873,546 entitled "METHODS AND APPARATUS FOR ENHANCED PARAMETER SELECTION, DETECTION AND CONFLICT RESOLUTION" filed Sep. 4, 2013, and assigned to the assignee hereof and hereby expressly incorporated by reference herein.

BACKGROUND

Aspects of the present disclosure relate generally to wireless communication systems, and more particularly to parameter selection, detection and conflict resolution.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home NodeBs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

In some wireless communication networks, inefficient utilization of available communication resources, particularly identification and/or identity resources for configurations, may lead to degradations in wireless communication. Even more, the foregoing inefficient resource utilization may inhibit network entities and/or devices in communication with a network device from achieving higher wireless communication quality. Thus, improvements in network entity configurations are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for communication comprises receiving a first set of selectable first parameter values for a first radio access technology (RAT) transmission-related parameter for a first RAT entity and a second set of selectable second parameter values for a second RAT transmission-related parameter for a second RAT entity. Further, the method comprises selecting a first parameter value for the first RAT transmission-related parameter from the first set of selectable first parameter values and a second parameter value for the second RAT transmission-related parameter from the second set of selectable second parameter values based at least in part on a mapping function that maps between ones of the first set of selectable first parameter values for the first RAT transmission-related parameter and the second set of selectable second parameter values for the second RAT transmission-related parameter. Moreover, the method comprises communicating using at least one of the first parameter value of the first RAT transmission-related parameter for the first RAT and the second parameter value of the second RAT transmission-related parameter for the second RAT.

In a further aspect, a non-transitory computer-readable medium comprises at least one instruction for causing a computer to receive a first set of selectable first parameter values for a first RAT transmission-related parameter for a first RAT entity and a second set of selectable second parameter values for a second RAT transmission-related parameter for a second RAT entity. The non-transitory computer-readable medium further comprises at least one instruction for causing a computer to select a first parameter value for the first RAT transmission-related parameter from the first set of selectable first parameter values and a second parameter value for the second RAT transmission-related parameter from the second set of selectable second parameter values based at least in part on a mapping function that maps between ones of the first set of selectable first parameter values for the first RAT transmission-related parameter and the second set of selectable second parameter values for the second RAT transmission-related parameter. Moreover, the non-transitory computer-readable medium comprises at least one instruction for causing a computer to communicate using at least one of the first parameter value of the first RAT transmission-related parameter for the first RAT and the second parameter value of the second RAT transmission-related parameter for the second RAT.

In another aspect, an apparatus for wireless communication comprises means for receiving a first set of selectable first parameter values for a first RAT transmission-related parameter for a first RAT entity and a second set of selectable second parameter values for a second RAT transmission-related parameter for a second RAT entity. The apparatus further comprises means for selecting a first parameter value for the first RAT transmission-related parameter from the first set of selectable first parameter values and a second parameter value for the second RAT transmission-related parameter from the second set of selectable second parameter values based at least in part on a mapping function that maps between ones of the first set of selectable first parameter values for the first RAT transmission-related parameter and the second set of selectable second parameter values for the second RAT transmission-related parameter. Moreover, the apparatus comprises means for communicating using at least one of the first parameter value of the first RAT transmission-related parameter for the first RAT and the second parameter value of the second RAT transmission-related parameter for the second RAT.

In yet another aspect, an apparatus for communication comprises a memory storing executable instructions and a processor in communication with the memory, wherein the processor is configured to execute the instructions to receive a first set of selectable first parameter values for a first RAT transmission-related parameter for a first RAT entity and a second set of selectable second parameter values for a second RAT transmission-related parameter for a second RAT entity. The processor is further configured to select a first parameter value for the first RAT transmission-related parameter from the first set of selectable first parameter values and a second parameter value for the second RAT transmission-related parameter from the second set of selectable second parameter values based at least in part on a mapping function that maps between ones of the first set of selectable first parameter values for the first RAT transmission-related parameter and the second set of selectable second parameter values for the second RAT transmission-related parameter. Moreover, the processor is further configured to communicate using at least one of the first parameter value of the first RAT transmission-related parameter for the first RAT and the second parameter value of the second RAT transmission-related parameter for the second RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
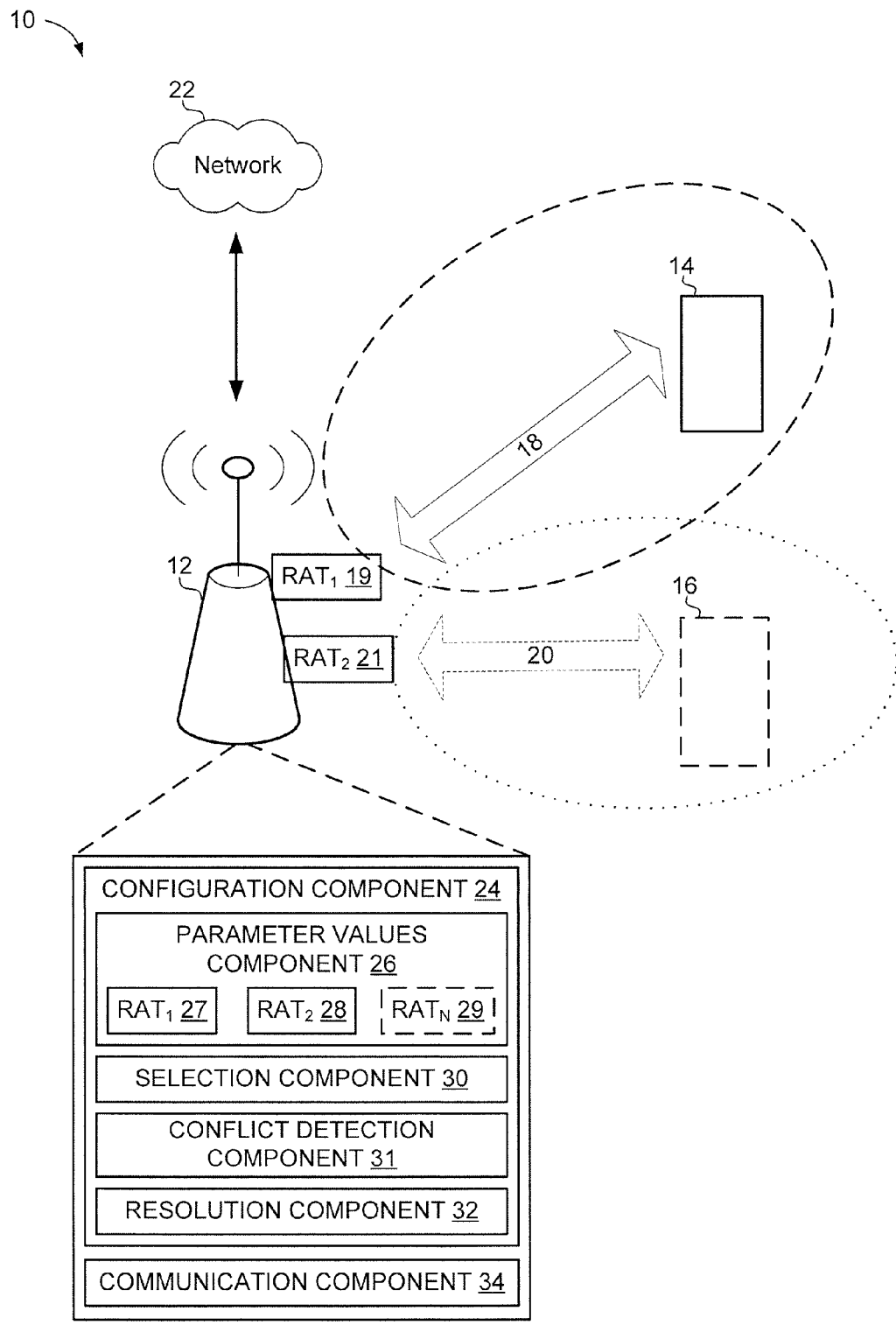
FIG. 1 is a schematic diagram of a communication network including an aspect of a network entity that may perform one or more parameter value selection, conflict detection, and resolution procedures.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a small cell node.

As used herein, the term "small cell node" or "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell node or small cell may include, but is not limited to, an apparatus such as a base station (BS), an access point, a femto node or cell, a pico node or cell, a micro node or cell, a Node B, an evolved Node B (eNB), a home Node B (HNB) or cell, or a home evolved Node B (HeNB) or cell. Therefore, the terms "small cell node" or "small cell," as used herein, refer to a relatively low transmit power node and/or a relatively small coverage area cell as compared to a macro node or cell.

A cell associated with a macro node, a small cell node, a femto node, or a pico node may be referred to as a macro cell, a small cell, a femto cell, or a pico cell, respectively. In some implementations, each cell may be further associated with (e.g., divided into) one or more sectors.

In various applications, other terminology may be used to reference a macro node, a small cell node, a femto node, or a pico node. For example, a macro node may be configured or referred to as an access node, base station, access point, eNodeB, macro cell, and so on. Also, a small cell node may be configured or referred to as a Home NodeB, Home eNodeB, access point base station, femto node or cell, femto access point, pico node or cell, and so on.

The present aspects generally relate to enhanced parameter value selection, conflict detection and resolution procedures at network entities. Specifically, network entities such as small cells (e.g., pico cells, femto cells, etc.) may engage in various configuration procedures in order to facilitate communication with one or more user equipments (UEs) and/or a core network. In such scenarios, configuration by the small cell may include one or more of selection, conflict detection and resolution of parameter values, such as a transmission-related parameter, for one or more supported radio access technology (RAT) entities. For example, a small cell may engage in a cell identity selection procedure to select a cell identity for facilitating communication. However, for small cells equipped with multiple RAT entities, some configurations may be conducted independently for each RAT entity. For example, but not limited hereto, a small cell equipped with at least two RAT entities may engage in two separate transmission-related parameter value selection procedures for each RAT entity.

As such, the small cell may unknowingly and independently select one or more RAT entity specific parameter values that may conflict or collide with values used by other nearby RAT entities. RAT entity specific conflict detection procedures may then be conducted by each RAT entity, or only by one RAT entity, and separately resolved by one or both RAT entities. That is, depending on conflict detection capabilities of each RAT entity, the small cell equipped with at least two RAT entities may conduct two separate conflict detection procedures, one for each RAT entity specific parameter value, in order to separately detect and resolve the conflict or collision.

Accordingly, in some aspects, the present methods and apparatus may provide an efficient and effective solution, as compared to current solutions, to provide enhanced parameter value selection, conflict detection and resolution procedures at network entities. In an aspect, the present apparatus and methods include a parameter value selection solution configured to simultaneously select a parameter value of a parameter for two or more supported RATs. Further, in an aspect, the present apparatus and methods include conflict detection solutions, based on the parameter value selection solution, to improve the detection performance of parameter value conflicts and/or reduce the complexity of such detection. For example, the present aspect may be applied to selecting one of a set of selectable parameter values of a transmission-related parameter for two or more RAT entities, and/or detecting a conflict or collision of such selected parameter values with other nearby RAT entities.

Referring to FIG. 1, in one aspect, a wireless communication system 10 includes network entity 12 configured to perform or conduct one or more parameter value selection, conflict detection and resolution procedures in order to avoid conflicting transmissions and/or facilitate communication with one or more UEs (e.g., UEs 14 and 16). For example, network entity 12 may be configured to randomly select one of a set of selectable parameter values of a transmission-related parameter in a RAT, and correspondingly select one of a set of selectable parameter values of a transmission-related parameter in another RAT as a function of the initial random selection and based on a relationship between the two sets of selectable parameter values. As such, the parameter value selections, while random, have a relationship to one another that may improve efficiency in selecting parameter values for more than one RAT, as well as improve efficiency in detecting and/or resolving conflicts with other nearby entities with respect to the parameter value selections.

In these aspects, network entity 12 may provide communication coverage for one or more UEs (e.g., UEs 14 and 16). Further, network entity 12 may communicate with network 22 via a wired or wireless backhaul communication network. In some aspects, multiple UEs including UEs 14 and 16 may be in communication coverage with network entity 12. In some aspects, network entity 12 may be a small cell node or small cell.

Moreover, network entity 12 may be configured with one or more RAT entities for communications. For example, network entity 12 may communicate according to or using first RAT entity (e.g., $RAT_1$ 19) and optionally, second RAT entity ($RAT_2$ 21). In such aspects, network entity 12 may configure each RAT entity in order to facilitate communication with one or more UEs, e.g., UE 14 and UE 16, on a respective one or more communication channels, e.g., communication channel 18 and communication channel 20. For instance, network entity 12 may configure one or more parameter values of one or more transmission-related parameters on or related to the first RAT entity 19. Further, for example, network entity 12 may optionally configure one or more parameter values of one or more transmission-related parameters on or related to the second RAT entity 21.

In particular, according to the present aspects, network entity 12 may include configuration component 24, which may be configured to perform one or more selection, conflict detection and resolution procedures in order to facilitate communication by one or more RAT entities. For example, configuration component 24 may enable or otherwise permit network entity 12 to independently or simultaneously select a parameter value of a transmission-related parameter for one or more RAT entities, detect one or more parameter value conflicts, and perform one or more resolution procedures based on or in response to the detected conflicts. That is, at a specified or pre-determined configuration interval or time, configuration component 24 may configure first RAT entity 19 and/or second RAT entity 21 by selecting a parameter value of a transmission-related parameter for one or more RAT entities (e.g., first RAT entity 19 and/or second RAT entity 21), and optionally perform one or more conflict detection and resolution procedures in order to detect and/or resolve actual or potential conflicts and/or collisions between at least two RAT entities.

For instance, configuration component 24 may include selection component 30, which may be configured to conduct enhanced parameter value selection using RAT-specific sets of selectable parameter values received by and stored in parameter values component 26. In some aspects, for example, selection component 30 may be configured to independently and/or simultaneously select a first parameter value for a first RAT transmission-related parameter of the first RAT entity 19 from a first set of selectable first RAT parameter values 27, a second parameter value for a second RAT transmission-related parameter of the second RAT entity 21 from the second set of second parameter values 28 and/or an parameter value$_N$ for an $RAT_N$ transmission-related parameter of a $RAT_N$ entity from a set of selectable $RAT_N$ parameter values 29, where N is any number greater than two. Hence, the selection of a parameter value of a RAT transmission-related parameter for a given RAT entity (e.g., first RAT entity 19) may be linked or mapped to the selection of a parameter value of a RAT transmission-related parameter for another RAT entity (e.g., second RAT entity 21).

It should be understood that parameter values component 26 may be configured to receive, obtain and/or store one or more sets or pools of parameter values associated with or for RAT transmission-related parameters of one or more RAT entities (e.g., first RAT entity 19 and/or second RAT entity 21). For instance, parameter values component 26 may be configured to receive at least a first set of first parameter values 27 for the first RAT transmission-related parameter of the first RAT entity 19 and a second set of second parameter values 28 for the second RAT transmission-related parameter of the second RAT entity 21. In some aspects, parameter values component 26 may be configured to receive one or more sets of parameter values for a RAT transmission-related parameter for a respective RAT entity. For instance, parameter values component 26 may be configured to receive a second set of first parameter values for or associated with the first RAT transmission-related parameter of the first RAT entity 19. In other aspects, for example, parameter values component 26 may be configured to receive a first set of parameter values for or associated with a RAT transmission-related parameter of the second RAT entity 19.

Moreover, the one or more RAT entities may include, but are not limited to, long term evolution (LTE), universal mobile telecommunications system (UMTS), code division multiple access (CDMA) 2000, wireless local area network (WLAN) (e.g., WiFi). Further, the transmission-related parameters associated with each of the one or more RAT entities, such as the foregoing non-limiting example RAT entities may include, but are not limited to, physical cell identity (PCI), primary synchronization code (PSC), pseudo-random noise code (PN), channel numbers and/or beacon patterns. Further aspects of selection component 30 are described herein with respect to FIG. 2.

In further aspects, configuration component 24 may include conflict detection component 31, which may be configured to detect a conflict and/or collision with respect to at least one of the selected parameter values associated with at least one of the RAT entities and another similar RAT entity transmitting nearby (e.g., having overlapping communication coverage). For instance, conflict detection component 31 may detect or otherwise determine that the parameter value of a transmission-related parameter associated with first RAT entity 19 (e.g., selected by selection component 30 from the first set of first parameter values 27) conflicts or collides with another nearby RAT entity. Upon detecting a conflict and/or collision between parameter values of at least two RAT entities, conflict detection component 31 may be configured to provide resolution component 32 with a conflict indication to trigger one or more conflict resolution procedures. Further aspects of conflict detection component 31 are described herein with respect to FIG. 3.

Additionally, configuration component 24 may include resolution component 32, which may be configured to resolve one or more conflicts or collisions detected by conflict detection component 31. For instance, resolution component 32 may be configured to resolve or otherwise determine new or updated non-conflicting/colliding parameter values for at least the conflicting or colliding RAT entity, e.g. first RAT entity 19 in the above example, which may allow the other corresponding RAT entity, e.g., second RAT entity 21 in the above example, to also update the related parameter value. Specifically, for example, resolution component 32 may be configured to select or otherwise determine a new or updated non-conflicting parameter value for first RAT entity 19 and second RAT entity 21 when a conflict or collision is detected by conflict detection component 31 for one or both of the first RAT entity 19 and the second RAT entity 21. Further aspects of resolution component 32 are described herein with respect to FIG. 3.

In additional aspects, network entity 12 may include communication component 34, which may be configured to transmit and receive communications with one or more UEs (e.g., UEs 14 and/or 16). For example, in an aspect, communication component 34 may receive the sets of parameter values (e.g., first set of first parameter values 27 and/or second set of second parameter values 28, etc.) from network 22, and provide the sets of parameter values to configuration component 24 for storage and processing. Additionally, communication component 34 may be configured to facilitate communication with one or more UEs (e.g., UEs 14 and/or 16) using at least one of a selected parameter value for the first RAT entity 19 and a selected parameter value for the second RAT entity 21. Further, communication component 34 may include, but is not limited to, one or more of a transmitter, a receiver, a transceiver, protocol stacks, transmit chain components, and receive chain components.

In some aspects, network entity 12 may include or additionally be referred to as a relay, a UE (e.g., communicating in peer-to-peer or ad-hoc mode with one or more of UEs 14 and 16), or substantially any type of component that can communicate with at least one of UEs 14 and 16 to provide wireless network access (e.g., to network 22) at the UEs 14 and 16.

Additionally, UEs 14 and 16 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 2:
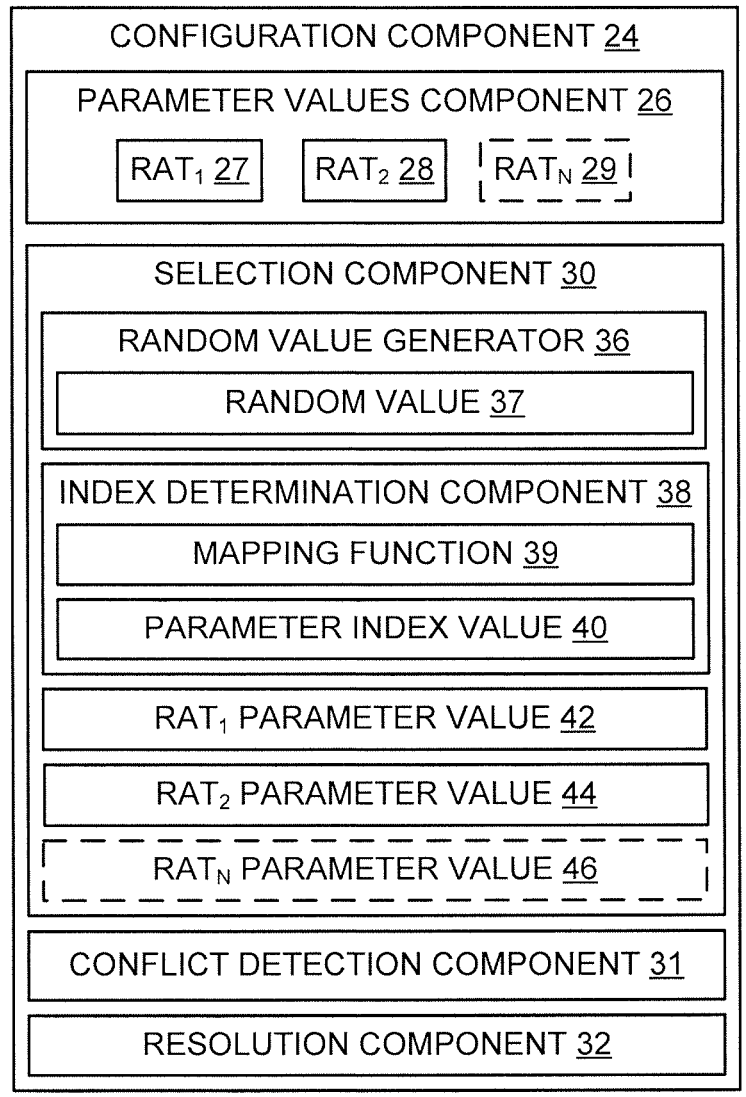
FIG. 2 is a schematic diagram of an aspect of the selection component of FIG. 1.

Referring to FIG. 2, in an aspect, selection component 30 may include various components and/or subcomponents, which may be configured to independently and/or simultaneously select at least a first parameter value for a first RAT transmission-related parameter of first RAT entity (e.g., first RAT entity 19, FIG. 1) and a second parameter value for a second RAT transmission-related parameter of a second RAT entity (e.g., second RAT entity 21, FIG. 1). In such aspects, selection component 30 may be configured to independently and/or simultaneously select a parameter value for the first RAT entity (e.g., $RAT_1$ parameter value 42) from the first set of first parameter values (e.g., first set of first parameter values 27) and a parameter value for the second RAT entity (e.g., $RAT_2$ parameter value 44) from the second set of second parameter values (e.g., second set of second parameter values 28).

In particular, selection component 30 may be configured to link or map the selected parameter values for at least two RAT entities. To accomplish such aspects, the first selection (e.g., $RAT_1$ parameter value 42) may be based on a first index that may, in some non-limiting aspects, be a function of a random number (e.g., random value 37), and the second selection (e.g., $RAT_2$ parameter value 44) may be based on a second index (e.g., parameter index value 40) that may be a function of the first index and a mapping function (e.g., mapping function 39) between the selectable parameter values of the respective RAT entities.

For instance, in order to obviate potential conflicts and/or collisions, and to assist in any future conflict detection and resolution procedures, selection component 30 may, during selection, link or map the selection of the parameter value of the first RAT entity (e.g., $RAT_1$ parameter value 42) and the parameter value of the second RAT entity (e.g., $RAT_2$ parameter value 44). In particular, for example, selection component 30 may be configured to make a first parameter value selection based on a first index that is a function of a random number, and a second parameter value selection based on a second index that is based on the first index and a mapping function between the selectable parameter values of the respective RATs.

For instance, selection component 30 may include random value generator 36, which may be configured to generate a random value 37 within a defined range. In some aspects, the defined range may be between an integer "1" and an integer value greater than "1". In other aspects, the defined range may be between an integer "1" and an integer value equal to a size or total value of one of the first set of first parameter values 27 and/or the second set of second parameter values 28.

Moreover, in some aspects, selection component 30 may receive or otherwise obtain (e.g., via conflict detection component 31) an indication that one or more random values, including random value 37 may conflict or collide with at least one random value of another RAT entity (e.g., based on a conflict/collision between at least one parameter value of network entity 12 and a parameter value of another RAT entity). In other words, the random values of two conflicting/colliding RAT entities may be the same. Further, in order to alleviate current conflicting or colliding scenarios or to obviate potential conflicting or colliding scenarios with at least another RAT entity, random value generator 36 may be configured to generate one or more random values including random value 37 based on a global cell identity (e.g., evolved universal terrestrial radio access network (E-UTRAN) cell global identifier). In other aspects, random value generator 36 may be configured to generate one or more random values including random value 37 based on a media access control (MAC) identifier of a RAT entity (e.g., network entity 12).

Selection component may be configured to use random value 37 as a first index value to select at least one of the first parameter value for the first RAT entity (e.g., $RAT_1$ parameter value 42) from the first set of first parameter values 27 for the first RAT transmission-related parameter and the second parameter for the second RAT entity (e.g., $RAT_2$ parameter value 44) from the second set of second parameter values 28 for the second RAT transmission-related parameter. Specifically, for example, selection component 30 may select or otherwise determine a first parameter value for the first RAT from the first set of first parameter values 27 that correspond to the random value 37. For instance, for a given random value 37 of "X", selection component 30 may select $RAT_1$ parameter value 42 from the first set of first parameter values according to a relationship between the value of "X" and a range corresponding to the different values in the first set of parameter values.

Further, selection component 30 may include index determination component 38, which may be configured to determine parameter index value 40, e.g., a second index value, according to a mapping function 39 applied to the random value 37, e.g., the first index value. In such aspects, index determination component 38 may be configured to link or map the first set of first parameter values for the first RAT entity (e.g., first set of first parameter values 27) and the second set of second parameter values for the second RAT entity (e.g., second set of second parameter values 28). Specifically, for instance, index determination component 38 may include mapping function 39 configured to map or link between respective values of two or more sets of technology parameter values. Specifically, mapping function 39 may provide a one-to-one, a one-to-many, or a many-to-one mapping between respective parameter values of different sets of selectable parameter values.

As such, index determination component 38 may in effect simultaneously select parameter values for at least two RAT entities by basing the selection of a second RAT parameter value (e.g., $RAT_2$ parameter value 44) on parameter index value 40 based on random value 37, which was used to select a first RAT parameter value, applied to mapping function 39 that defines a relationship between the two separate RAT-specific sets of parameter values, e.g. first set of first parameter values 27 and second set of second parameter values 28.

In particular, for example, selection component 30 may be configured to select the second parameter value (e.g., $RAT_2$ parameter value 44) for a second RAT transmission-related parameter may be based on random value 37 associated with selecting a first parameter value (e.g., $RAT_1$ parameter value 42) of a first RAT transmission-related parameter and a mapping function 39 between a first set of selectable first parameter values 27 for the first RAT transmission-related parameters and a second set of selectable second parameter values 28 for the second RAT transmission-related parameter. Hence, the second RAT entity may use a value (e.g., parameter index value 40) selectively tied to the value (e.g., random value 37) used by the first RAT entity. As such, a collision or conflict detected at one RAT entity based on the use of the parameter index value 40 may indicate a collision or conflict at the other RAT entity.

In a non-limiting example of the aspects relating to selection component 30, first RAT entity (e.g., $RAT_1$ 19) may be a RAT entity configured to communicate according to UMTS and second RAT entity (e.g., $RAT_2$ 21) may be a RAT entity configured to communicate according to LTE. Accordingly, selection component 30 may be configured to simultaneously or independently (e.g., at different times) select a parameter value for UMTS and LTE. Specifically, for example, selection component 30 may select, according to the random value 37 generated by random value generator 36 a parameter value associated with one of UMTS and LTE. Hence, selection component 30 may be configured to select, using the random value 37, either a PSC for UMTS or PCI for LTE from the set or pool of PSCs and PCIs, respectively. Further, selection component 30 may select a parameter value (e.g., PSC or PCI) for the other of UMTS or LTE based on parameter index value 40 determined by mapping function 39.

It should be understood that selection component 30 may be configured to select parameter values for any number and/or combination of technologies. As such, for example, in deployment scenarios where at least one of the RAT entities are configured to communicate according to WLAN, selection component 30 may select a parameter value based on WLAN communication characteristics. For instance, selection component 30 may select a channel number and/or beacon pattern from a set or group of channel numbers or beacon pattern according to one or both of the random value 37 and parameter index value 40.

Figure 3:
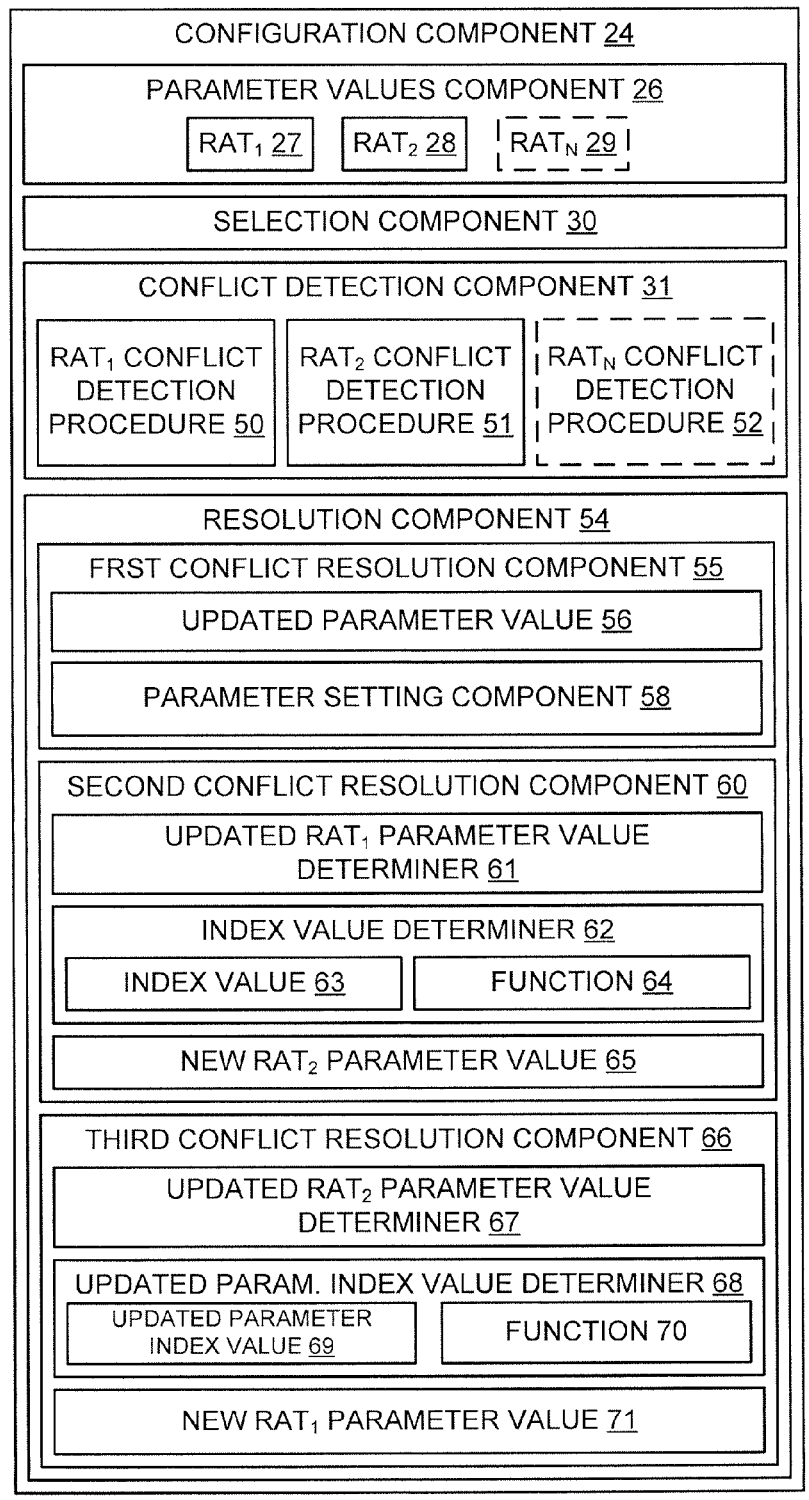
FIG. 3 is a schematic diagram of an aspect of the conflict detection component and resolution component of FIG. 1.

Referring to FIG. 3, in an aspect, conflict detection component 31 may be configured to perform one or more technology-specific parameter conflict detection procedures. For example, conflict detection component 31 may be configured to conduct or perform at least one conflict detection procedure (e.g., $RAT_1$ conflict detection procedure 50, $RAT_2$ conflict detection procedure 51 and/or $RAT_N$ conflict detection procedure 52) for a specified RAT (e.g., first RAT entity 19, FIG. 1) to identify a conflict or collision in a selected parameter value with another nearby RAT entity. In some aspects, conflict detection component 31 may be configured perform one or more technology-specific parameter conflict detection procedures periodically and/or based on selecting a parameter value to validate or verify a non-conflict or non-collision condition/state for the respective RAT entity. In such aspects, conflict detection component 31 may be configured to detect at least one conflict condition based on the performing of at least one of the first RAT transmission-related parameter conflict detection procedure (e.g., $RAT_1$ conflict detection procedure 50) and the second RAT transmission-related parameter conflict detection procedure (e.g., $RAT_2$ conflict detection procedure 51).

In further aspects, resolution component 54 may be configured to resolve one or more conflicts detected by conflict detection component 31. For example, resolution component 54 may be configured to resolve a conflict or collision detected between at least two parameter values for two respective RAT transmission-related parameters. In other words, resolution component 54 may determine or otherwise select a non-conflict or updated parameter value for at least one RAT entity that conflicts with at least another RAT entity.

Resolution component 54 may be configured to perform one or more conflict resolution procedures. For instance, resolution component 54 may include first conflict resolution component 55, which may be configured to obtain an updated parameter value 56 for at least one of the first RAT entity (e.g., first RAT entity 19, FIG. 1) and the second RAT entity (e.g., second RAT entity 21, FIG. 1) in response to detecting a conflict or collision by the one or more technology-specific parameter conflict detection procedures (e.g., $RAT_1$ conflict detection procedure 50, $RAT_2$ conflict detection procedure 51 and/or $RAT_N$ conflict detection procedure 52). Further, first conflict resolution component 55 may include parameter setting component 58, which may be configured to set the parameter value for one or both of the first RAT entity and the second RAT entity using the updated parameter value 56. For example, parameter setting component 58 may obtain or otherwise determine a new or updated parameter value for one of the first RAT entity 19 or second RAT entity 21 that does not conflict or collide with a parameter value of at least one other RAT entity.

Moreover, resolution component 54 may include second conflict resolution component 60, which may be configured to resolve a parameter value conflict or collision when a RAT parameter value conflict is detected. In such aspects, the detection of a conflict or collision between the first parameter value (e.g., $RAT_1$ parameter value 42) for the first RAT transmission-related parameter of the first RAT entity and another parameter value for another RAT transmission-related parameter may satisfy or trigger at least one conflict condition (e.g., conflict triggering condition associated with the first RAT entity). For example, second conflict resolution component 60 includes updated $RAT_1$ technology value determiner 61, which may be configured to determine or otherwise obtain a first updated first parameter value for the first RAT transmission-related parameter of first RAT entity.

In an aspect, upon determination of the first updated first parameter value, network entity 12 may permit or engage in reselection with one or more UEs using the first updated first parameter value. Moreover, in such aspects, conflict detection component 31 may perform the first RAT transmission-related parameter conflict detection procedure (e.g., $RAT_1$ conflict detection procedure 50) to determine or otherwise detect at least one conflict condition with respect to the determined first updated first parameter value. That is, network entity 12 may monitor or otherwise continue to determine whether the first updated first parameter value conflicts with another RAT entity. As such, second conflict resolution component 60 may be configured (e.g., via updated $RAT_1$ technology value determiner 61) to determine or otherwise obtain a second updated first parameter value for the first RAT transmission-related parameter of the first RAT entity in response to detecting at least one conflict condition with respect to the first updated first parameter value.

In some aspects, continuous conflict determination procedures using, for instance, conflict detection component 31 may be performed on or using each subsequent updated first parameter value to determine whether a conflict exists with another RAT entity. Further, second conflict resolution component 60 may be configured to preserve or otherwise maintain the parameter value (e.g., $RAT_1$ parameter value 42) for the first RAT entity when the first updated first parameter value and the second updated first parameter value conflicts or continues to conflict with a parameter value for another RAT entity.

Further, second conflict resolution component 60 includes index value determiner 62, which may be configured to determine an index value 63 for the second RAT entity as a function 64 of updated index value for the first RAT entity. In such aspects, and upon such determination, second conflict resolution component 60 may be configured to select a new second parameter value for the second RAT entity (e.g., new $RAT_2$ parameter value 65) from the second set of second parameter values (e.g., second set of second technology parameter values 28) based at least on the index value 63.

In addition, resolution component 54 may include third conflict resolution component 66, which may be configured to resolve a parameter value conflict or collision when the second RAT entity parameter value conflict is detected. In such aspects, the detection of a conflict or collision between the second parameter value (e.g., $RAT_2$ parameter value 44) for the second RAT transmission-related parameter of the second RAT entity and another parameter value for another RAT transmission-related parameter may satisfy or trigger at least one conflict condition (e.g, conflict triggering condition associated with the second RAT entity). For example, third conflict resolution component 66 includes updated $RAT_2$ parameter value determiner 67, which may be configured to determine or otherwise obtain a first updated second parameter value for the second RAT transmission-related parameter.

In an aspect, upon determination of the first updated second parameter value, network entity 12 may permit or engage in reselection with one or more UEs using the first updated second parameter value. Moreover, in such aspects, conflict detection component 31 may perform the second RAT transmission-related parameter conflict detection procedure (e.g., $RAT_2$ conflict detection procedure 51) to determine or otherwise detect at least one conflict condition with respect to the determined first updated second parameter value. That is, network entity 12 may monitor or otherwise continue to determine whether the first updated second parameter value conflicts with another RAT entity.

As such, third conflict resolution component 66 may be configured (e.g., via updated $RAT_2$ technology value determiner 67) to determine or otherwise obtain a second updated second parameter value for the second RAT transmission-related parameter of the second RAT entity in response to detecting at least one conflict condition with respect to the first updated second parameter value. In some aspects, continuous conflict determination procedures using, for instance, conflict detection component 31 may be performed on or using each subsequent updated second parameter value to determine whether a conflict exists with another RAT entity. Third conflict resolution component 66 may be configured to preserve the second parameter value for the second RAT entity when the first updated second parameter value and the second updated second parameter value conflicts or continues to conflict a parameter value with another RAT entity.

Further, third conflict resolution component 66 includes updated parameter index value determiner 68, which may be configured to determine an updated parameter index value 69 for the first RAT entity as a function 70 of an index value for the second RAT entity. In such aspects, and upon such determination, third conflict resolution component 66 may be configured to select a new first parameter value for the first RAT entity (e.g., new $RAT_1$ parameter value 71) from the first set of first parameter values (e.g., first set of first parameter values 27) based at least on the updated parameter index value for the first RAT entity.

Figure 4:
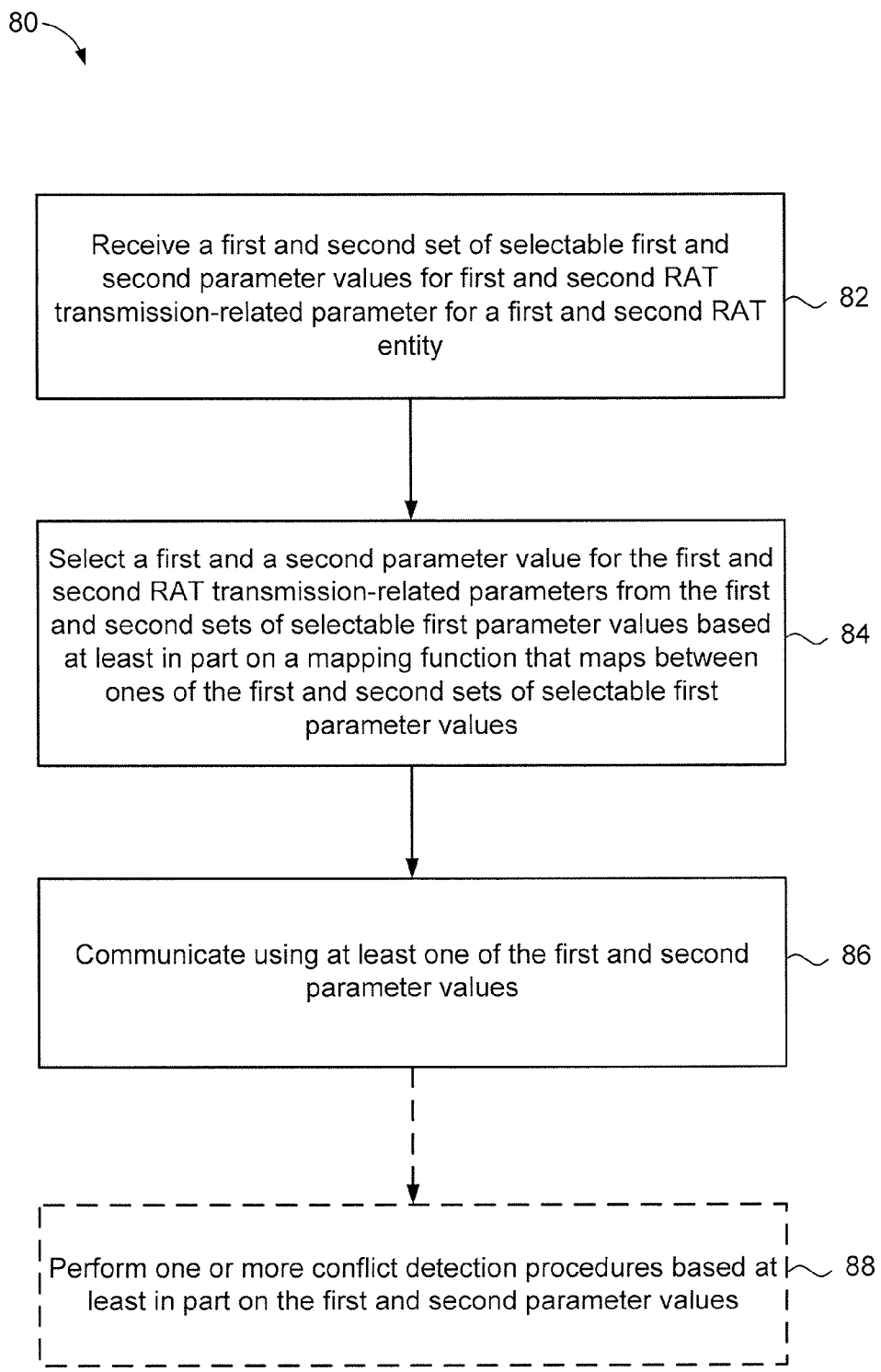
FIG. 4 is a flowchart of an aspect of a method of wireless communication, e.g., according to FIG. 1.

Referring to FIG. 4, in operation, a network entity such as network entity 12 (FIG. 1) may perform one aspect of a method 80 for selecting at least one parameter value for a first RAT transmission-related parameter and/or a second RAT transmission-related parameter based on a random value and mapping function. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 82, method 80 may include receive a first set of selectable first parameter values for a first RAT transmission-related parameter for a first RAT entity and a second set of selectable second parameter values for a second RAT transmission-related parameter for a second RAT entity. For example, as described herein, configuration component 24 (FIG. 1) may execute parameter values component 26 to receive a first set of selectable first parameter values (e.g., $RAT_1$ parameter values 27) for a first RAT (e.g., first RAT entity 19) and a second set of selectable second parameter values (e.g., $RAT_2$ parameter values 28) for a second RAT (e.g., second RAT entity 21).

In a further aspect, at block 84, method 80 may select a first parameter value for the first RAT transmission-related parameter from the first set of selectable first parameter values and a second parameter value for the second RAT transmission-related parameter from the second set of selectable second parameter values based at least in part on a mapping function that maps between ones of the first set of selectable first parameter values for the first RAT transmission-related parameter and the second set of selectable second parameter values for the second RAT transmission-related parameter. In some aspects, method 80 may select a first parameter value for the first RAT transmission-related parameter from the first set of selectable first parameter values and a second parameter value for the second RAT transmission-related parameter from the second set of selectable second parameter values based in part on a random value.

For instance, as described herein, configuration component 24 (FIG. 1) may execute selection component 30 to select a first parameter value for the first RAT transmission-related parameter (e.g., $RAT_1$ parameter value 42) from the first set of selectable first parameter values (e.g., $RAT_1$ parameter values 27) and a second parameter value for the second RAT transmission-related parameter (e.g., $RAT_2$ parameter value 44) from the second set of selectable second parameter value (e.g., $RAT_2$ technology parameter values 28) based on one or both of a random value and a mapping function that maps between ones of the first set of selectable first parameter values for the first RAT transmission-related parameter and the second set of selectable second parameter values for the second RAT transmission-related parameter.

Moreover, at block 86, method 80 may communicate using at least one of the first parameter value of the first RAT transmission-related parameter for the first RAT and the second parameter value of the second RAT transmission-related parameter for the second RAT. For example, as described herein, network entity 12 may execute communication component 34 to communicate using at least one of the first parameter value of the first RAT transmission-related parameter (e.g., $RAT_1$ parameter value 42) and the second parameter value for the second RAT transmission related parameter (e.g., $RAT_2$ parameter value 44).

At block 88, method 80 may optionally perform one or more conflict detection procedures based at least in part on the first parameter value for the first RAT transmission-related parameter and the second parameter value for the second RAT transmission-related parameter. For instance, as described herein, configuration component 24 may execute one or both of conflict detection component 31 and resolution component 32 to perform one or more conflict detection procedures based at least in part on the first parameter value for the first RAT transmission-related parameter and the second parameter value for the second RAT transmission-related parameter.

In some aspects, upon detection of a conflict triggering condition, one or both of a first RAT transmission-related parameter conflict detection procedure and a second RAT transmission-related parameter conflict detection procedure may be performed. Further, based on the determination from the one or more conflict detection procedures that a conflict condition exists, an updated parameter value may be obtained. Upon such determination, network entity 12 may permit or attempt to engage in reselection with one or more UEs while continuing to monitor or determine whether the updated parameter value conflict with another RAT entity.

Figure 5:
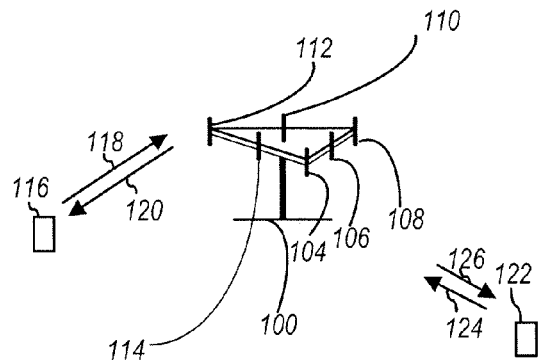
FIG. 5 illustrates a multiple access wireless communication system including an aspect of the network entity described, e.g., according to FIG. 1.

Referring to FIG. 5, a multiple access wireless communication system according to one aspect is illustrated. An access point 100 (AP) includes multiple antenna groups, one including 104 and 106, another including 108 and 110, and an additional including 112 and 114. Further, in some aspects, AP 100 may be the same or similar as network entity 12 including configuration component 24 (FIG. 1). In FIG. 5, only two antennas are shown for each antenna group, however, more or fewer antennas may be utilized for each antenna group. Access terminal 116 (AT), which may be the same as or similar to UEs 14 and 16 (FIG. 1), is in communication with antennas 112 and 114, where antennas 112 and 114 transmit information to access terminal 116 over forward link 120 and receive information from access terminal 116 over reverse link 118. Access terminal 122, which may be the same as or similar to UE 14 (FIG. 1), is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a small cell node, an access point, a Node B, an evolved Node B (eNB), or some other terminology. An access terminal may also be called an access terminal, user equipment (UE), a wireless communication device, terminal, access terminal or some other terminology.

Figure 6:
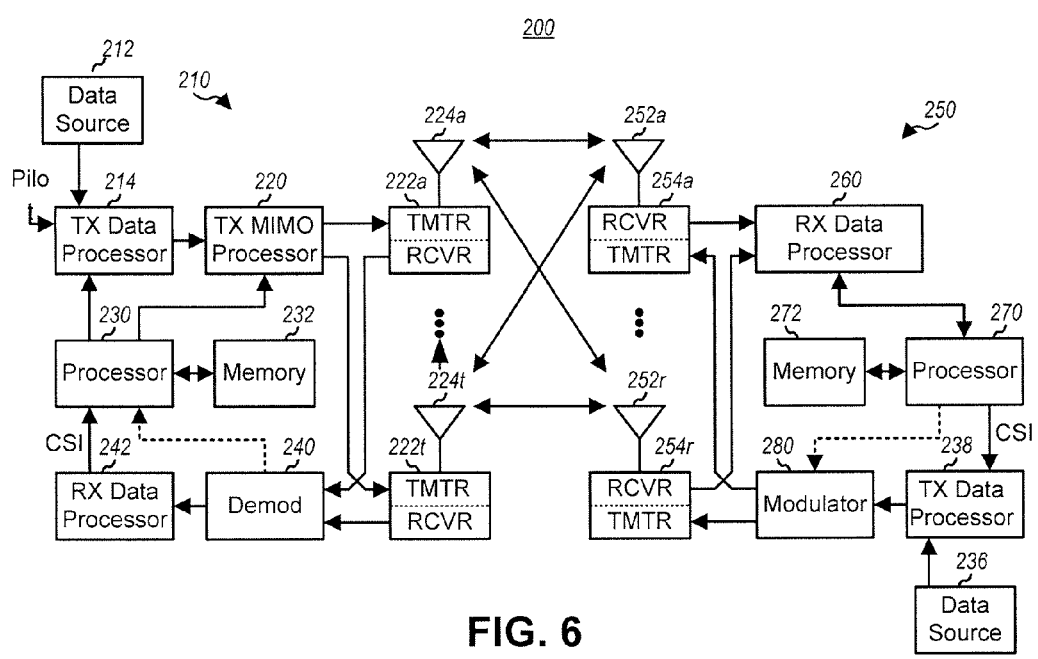
FIG. 6 illustrates a block diagram of a communication system including an aspect of the user equipment described herein.

FIG. 6 is a block diagram of an aspect of a transmitter system 210 (also known as the access point) and a receiver system 250 (also known as access terminal) in a Multiple-Input Multiple-Output (MIMO) system 200. In other aspects, transmitter system 210 may be the same as or similar to network entity 12 including configuration component 24 (FIG. 1). Further, in other aspects, receiver system 250 may be the same as or similar to UEs 14 and 16 (FIG. 1). At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)

Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 7:
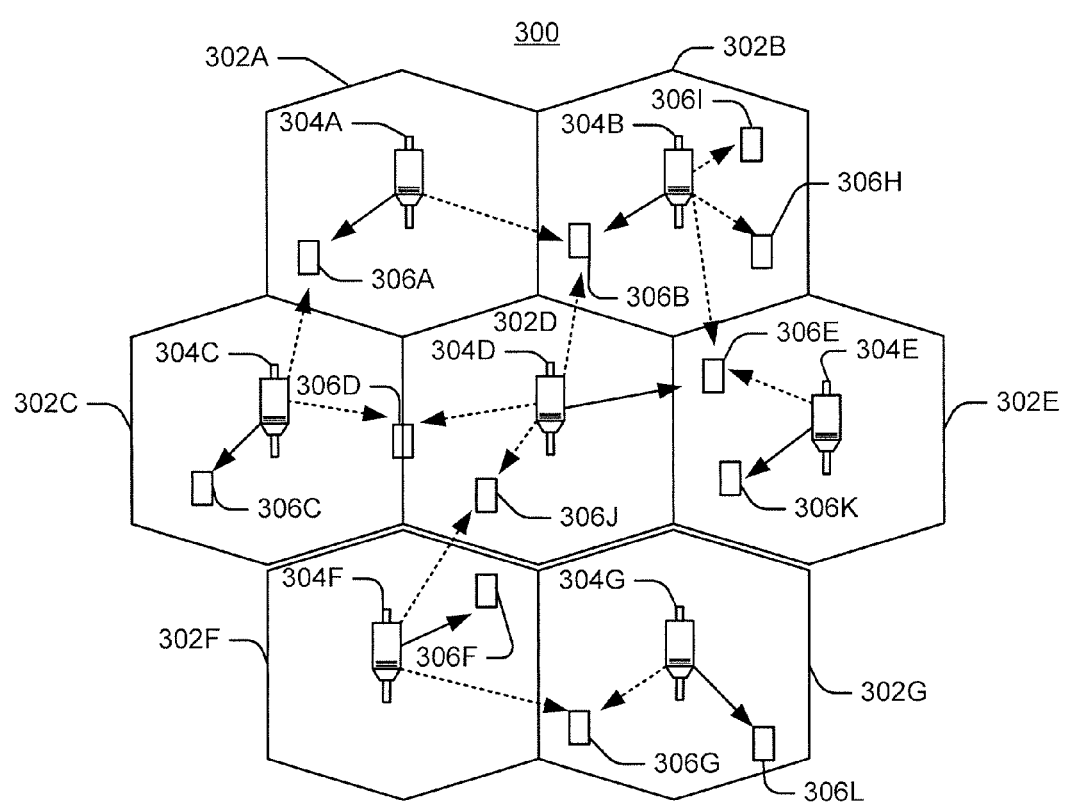
FIG. 7 illustrates a wireless communication system, configured to support a number of users, in which the aspects related to the user equipment described herein may be implemented.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C—Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U—User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 7 illustrates a wireless communication system 300, configured to support a number of users, in which the teachings herein may be implemented. The system 300 provides communication for multiple cell overage areas 302, such as, for example, small cell coverage area 302A-302G, with each cell coverage area being serviced by a corresponding small cell 304 (e.g., small cell 304A-304G). In some aspects, small cell coverage area 302A-302G may be the same as or similar to a coverage area provided by network entity 12 including configuration component 24 (FIG. 1). Further, in other aspects, each small cell 304 may be the same as or similar to network entity 12 including configuration component 24 (FIG. 1). As shown in FIG. 7, access terminals 306 (e.g., access terminals 306A-306L) may be dispersed at various locations throughout the system over time, wherein each access terminal 306 may be the same as or similar to UEs 14 and 16 (FIG. 1). Each access terminal 306 may communicate with one or more small cells 304 on a forward link ("FL") and/or a reverse/down link ("RL) at a given moment, depending upon whether the access terminal 306 is active and whether it is in soft handoff, for example. The wireless communication system 300 may provide service over a large geographic region.

Figure 8:
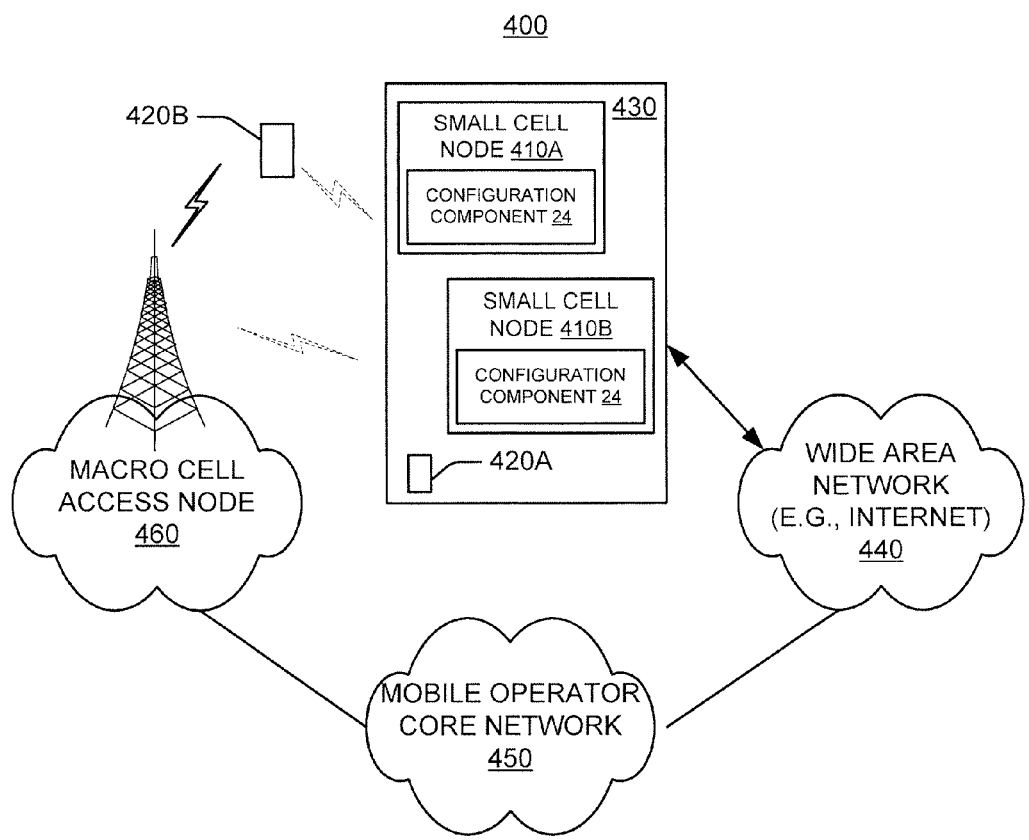
FIG. 8 illustrates an aspect of a communication system to enable deployment of small cell nodes within a network environment including an aspect of the user equipment described herein.

FIG. 8 illustrates an example communication system 400 where one or more small cell nodes are deployed within a network environment. Specifically, the system 400 includes multiple small cell nodes 410 (e.g., small cell nodes or HNB 410A and 410B) installed in a relatively small scale network environment (e.g., in one or more user residences 430), wherein the small cell nodes 410 may be the same as or similar to network entity 12 including configuration component 24 (FIG. 1). Each small cell node 410 may be coupled to a wide area network 440 (e.g., the Internet) and a mobile operator core network 450 via a DSL router, a cable modem, a wireless link, or other connectivity means (not shown). As will be discussed below, each small cell node 410 may be configured to serve associated access terminals 420 (e.g., access terminal 420A) and, optionally, alien access terminals 420 (e.g., access terminal 420B), both of which may be the same as or similar to UEs 14 and 16 (FIG. 1). In other words, access to small cell nodes 410 may be restricted whereby a given access terminal 420 may be served by a set of designated (e.g., home) small cell node(s) 410 but may not be served by any non-designated small cell nodes 410 (e.g., a neighbor's small cell node 410).

For example, the owner of a small cell node 410 may subscribe to mobile service, such as, for example, 3G mobile service (e.g., UEs 14 and 16 of FIG. 1), offered through the mobile operator core network 450. In addition, an access terminal 420 may be capable of operating both in macro environments and in smaller scale (e.g., residential) network environments. In other words, depending on the current location of the access terminal 420, the access terminal 420 may be served by an access node 460 of the macro cell mobile network 450 or by any one of a set of small cell nodes 410 (e.g., the small cell nodes 410A and 410B that reside within a corresponding user residence 430). For example, when a subscriber is outside his home, he is served by a standard macro access node (e.g., node 460) and when the subscriber is at home, he is served by a small cell node (e.g., node 410A). Here, it should be appreciated that a small cell node 420 may be backward compatible with existing access terminals 420.

A small cell node 410 may be deployed on a single frequency or, in the alternative, on multiple frequencies. Depending on the particular configuration, the single frequency or one or more of the multiple frequencies may overlap with one or more frequencies used by a macro node (e.g., node 460). In some aspects, an access terminal 420 may be configured to connect to a preferred small cell node (e.g., the home small cell node of the access terminal 420) whenever such connectivity is possible. For example, whenever the access terminal 420 is within the user's residence 430, it may be desired that the access terminal 420 communicate only with the home small cell node 410.

In some aspects, if the access terminal 420 operates within the macro cellular network 450 but is not residing on its most preferred network (e.g., as defined in a preferred roaming list), the access terminal 420 may continue to search for the most preferred network (e.g., the preferred small cell node 410) using a Better System Reselection ("BSR"), which may involve a periodic scanning of available systems to determine whether better systems are currently available, and subsequent efforts to associate with such preferred systems. With the acquisition entry, the access terminal 420 may limit the search for specific band and channel. For example, the search for the most preferred system may be repeated periodically. Upon discovery of a preferred small cell node 410, the access terminal 420 selects the small cell node 410 for camping within its coverage area.

A small cell node may be restricted in some aspects. For example, a given small cell node may only provide certain services to certain access terminals. In deployments with so-called restricted (or closed) association, a given access terminal may only be served by the macro cell mobile network and a defined set of small cell nodes (e.g., the small cell nodes 410 that reside within the corresponding user residence 430). In some implementations, a node may be restricted to not provide, for at least one node, at least one of: signaling, data access, registration, paging, or service.

In some aspects, a restricted small cell node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., small cell nodes) that share a common access control list of access terminals. A channel on which all small cell nodes (or all restricted small cell nodes) in a region operate may be referred to as a small cell channel.

Various relationships may thus exist between a given small cell node and a given access terminal. For example, from the perspective of an access terminal, an open small cell node may refer to a small cell node with no restricted association. A restricted small cell node may refer to a small cell node that is restricted in some manner (e.g., restricted for association and/or registration). A home small cell node may refer to a small cell node on which the access terminal is authorized to access and operate on. A guest small cell node may refer to a small cell node on which an access terminal is temporarily authorized to access or operate on. An alien small cell node may refer to a small cell node on which the access terminal is not authorized to access or operate on, except for perhaps emergency situations (e.g., 911 calls).

From a restricted small cell node perspective, a home access terminal may refer to an access terminal that authorized to access the restricted small cell node. A guest access terminal may refer to an access terminal with temporary access to the restricted small cell node. An alien access terminal may refer to an access terminal that does not have permission to access the restricted small cell node, except for perhaps emergency situations, for example, such as 911 calls (e.g., an access terminal that does not have the credentials or permission to register with the restricted small cell node).

Figure 9:
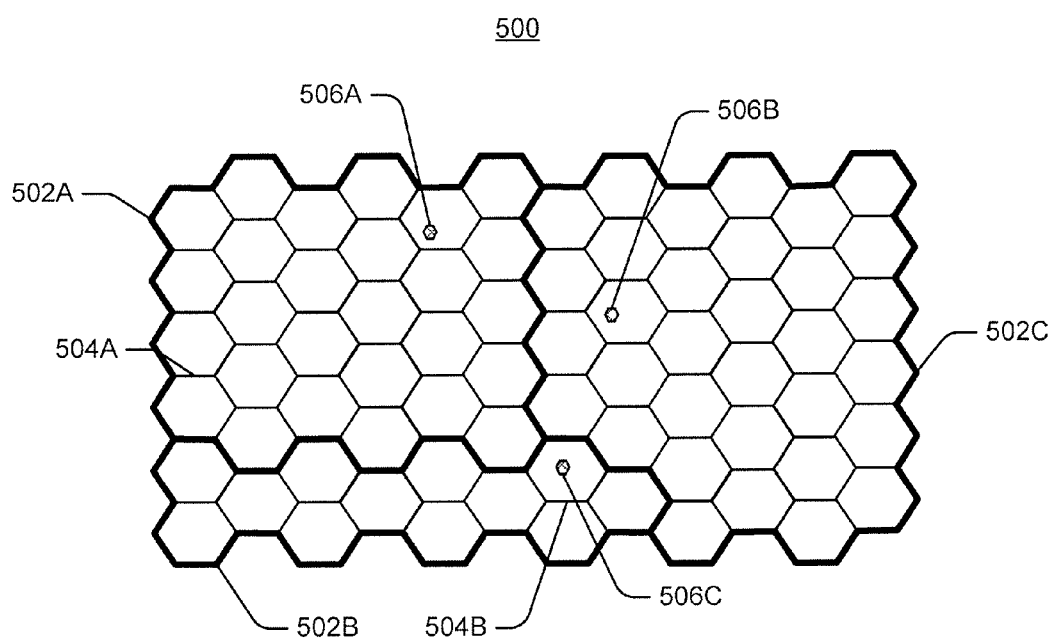
FIG. 9 illustrates an aspect of a coverage map where several tracking areas are defined, some of which may be provided by the user equipment described herein.

FIG. 9 illustrates an example of a coverage map 500 where several tracking areas 502 (or routing areas or location areas) are defined, each of which includes several macro coverage areas 504. Here, areas of coverage associated with tracking areas 502A, 502B, and 502C are delineated by the wide lines and the macro coverage areas 504 are represented by the hexagons. The tracking areas 502 also include small cell coverage areas 506, which may be provided by network entity 12 including configuration component 24 (FIG. 1). In this example, each of the small cell coverage areas 506 (e.g., small cell coverage area 506C) is depicted within a macro coverage area 504 (e.g., macro coverage area 504B). It should be appreciated, however, that a small cell coverage area 506 may not lie entirely within a macro coverage area 504. In practice, a large number of small cell coverage areas 506 may be defined with a given tracking area 502 or macro coverage area 504.

Figure 10:
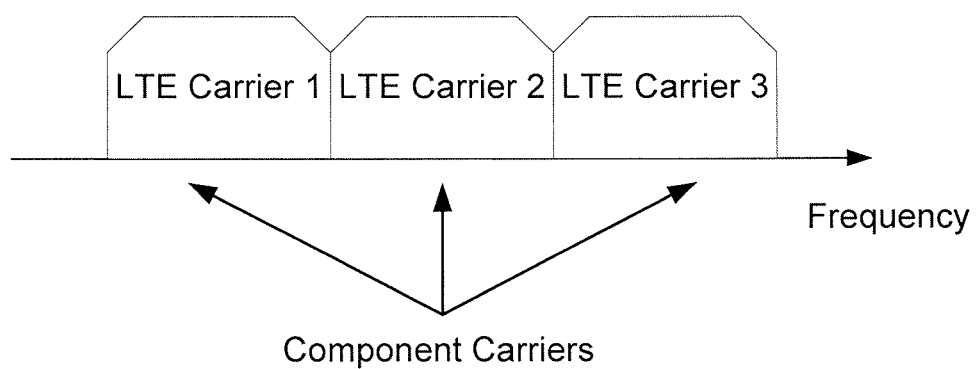
FIG. 10 illustrates an aspect of a continuous carrier aggregation type in accordance with an aspect of the present disclosure, e.g., according to FIG. 1.
Figure 11:
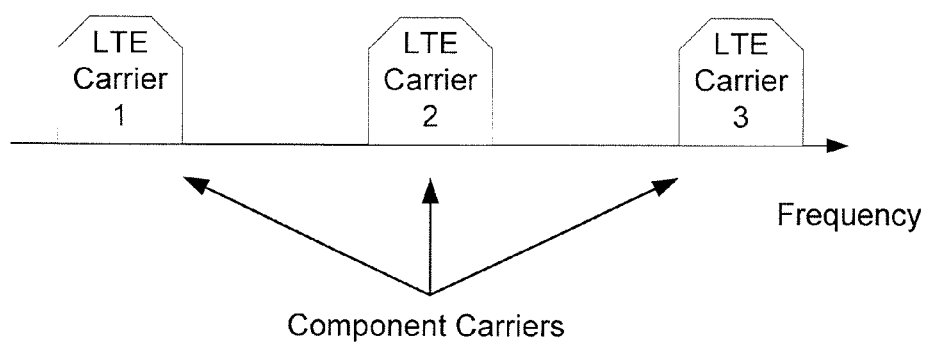
FIG. 11 illustrates an aspect of a non-continuous carrier aggregation type in accordance with an aspect of the present disclosure, e.g., according to FIG. 1.

UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 10 and 11, respectively. Continuous CA occurs when multiple available component carriers are adjacent to each other (as illustrated in FIG. 11). On the other hand, non-continuous CA occurs when multiple non-adjacent available component carriers are separated along the frequency band (as illustrated in FIG. 11). It should be understood that any one or more small cells (e.g., network entities), including network entity 12, illustrated in FIG. 1, may communicate or facilitate communication according to the aspects set forth with regard to FIGS. 11 and 12.

Both non-continuous and continuous CA may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

LTE-A standardization may require carriers to be backward-compatible, to enable a smooth transition to new releases. However, backward-compatibility may require the carriers to continuously transmit common reference signals (CRS), also may be referred to as (cell-specific reference signals) in every subframe across the bandwidth. Most cell site energy consumption may be caused by the power amplifier since the cell remains on even when only limited control signalling is being transmitted, causing the amplifier to continuously consume energy. CRS were introduced in release 8 of LTE standard and may be referred to as LTE's most basic downlink reference signal. For example, CRS may be transmitted in every resource block in the frequency domain and in every downlink subframe. CRS in a cell can be for one, two, or four corresponding antenna ports. CRS may be used by remote terminals to estimate channels for coherent demodulation. A new carrier type may allow temporarily switching off of cells by removing transmission of CRS in four out of five subframes. This reduces power consumed by the power amplifier. It also may reduce the overhead and interference from CRS since the CRS won't be continuously transmitted in every subframe across the bandwidth. In addition, the new carrier type may allow the downlink control channels to be operated using UE-specific demodulation reference symbols. The new carrier type might be operated as a kind of extension carrier along with another LTE/LTE-A carrier or alternatively as standalone non-backward compatible carrier.

Figure 12:
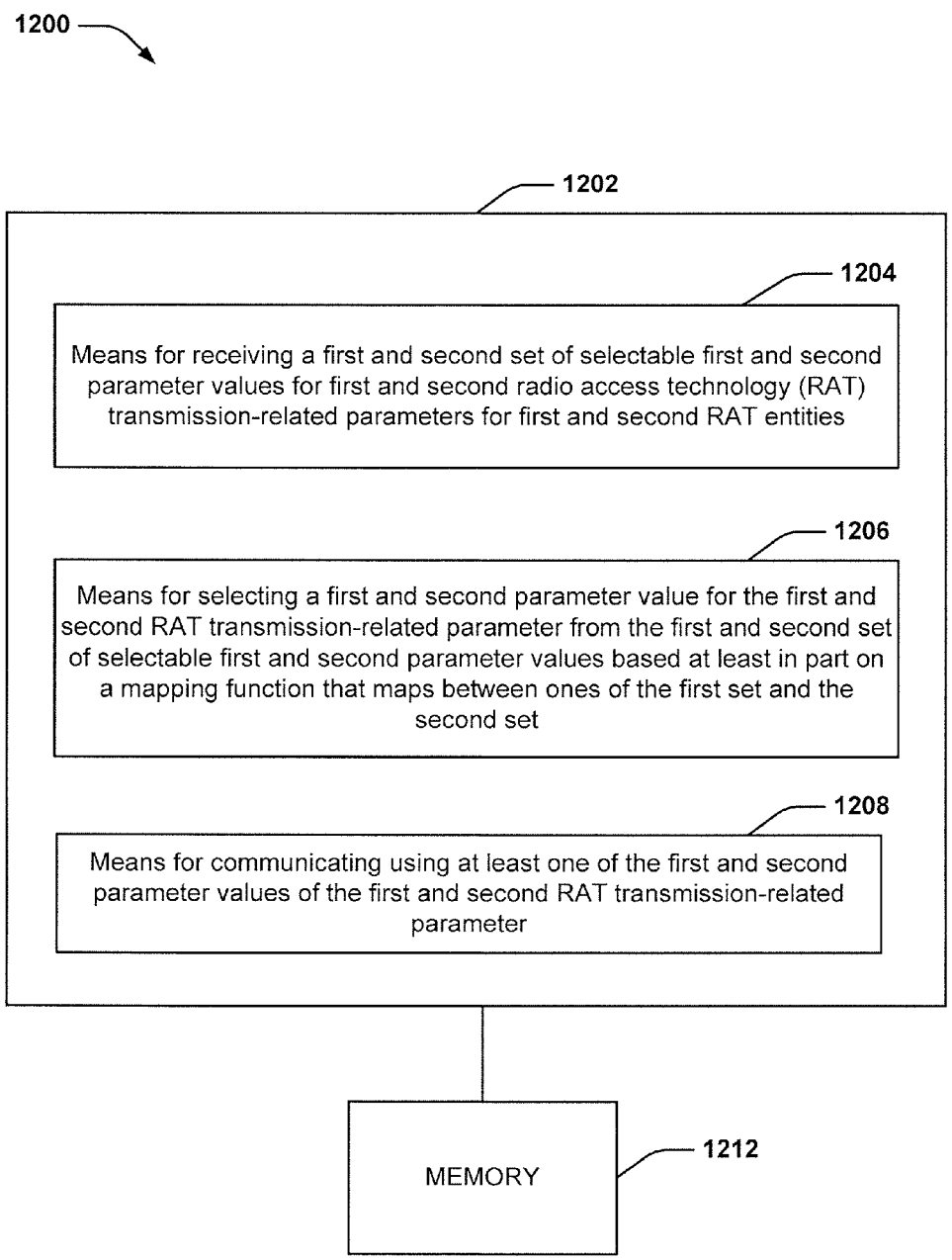
FIG. 12 illustrates an aspect of a system for detecting collisions in accordance with the present disclosure.

Referring to FIG. 12, an example system 1200 for parameter selection, detection and conflict resolution may operate according to the aspects of the configuration component 24 and the corresponding methods (FIGS. 1-4). For example, but not limited hereto, system 1200 may reside at least partially within a network entity, such as a small cell. It is to be appreciated that system 1200 may be represented as including functional blocks, which may be functional blocks that represent functions implemented by a processor including configuration component 24 (FIGS. 1-3), software, or combination thereof (e.g., firmware). System 1200 may include a logical grouping 1202 of means that can act in conjunction. For instance, logical grouping 1202 may include means for receiving a first set of selectable first parameter values for a first radio access technology (RAT) transmission-related parameter for a first RAT entity and a second set of selectable second parameter values for a second RAT transmission-related parameter for a second RAT entity.

Further, logical grouping 1202 may include means for selecting a first parameter value for the first RAT transmission-related parameter from the first set of selectable first parameter values and a second parameter value for the second RAT transmission-related parameter from the second set of selectable second parameter values based at least in part on a mapping function that maps between ones of the first set of selectable first parameter values for the first RAT transmission-related parameter and the second set of selectable second parameter values for the second RAT transmission-related parameter. Moreover, logical grouping 1202 may include means for communicating using at least one of the first parameter value of the first RAT transmission-related parameter for the first RAT and the second parameter value of the second RAT transmission-related parameter for the second RAT. Thus, as described, the small cell or network entity may select a parameter for improved conflict/collision detection and resolution. Additionally, system 1200 may include a memory 1212 that retains instructions for executing functions associated with the means 1204, 1206 and 1208. While shown as being external to memory 1212, it may be understood that one or more of the means 1204, 1206 and 1208 may exist and/or reside within memory 1312. Additionally, each of the means 1204, 1206 and 1208 may include one or more electrical components.

For convenience, the disclosure herein describes various functionality in the context of a small cell node. It should be appreciated, however, that the techniques described herein may be used for various types of nodes in various wireless communication networks. For instance, such communication networks include, but are not limited to, networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

It should be understood that the specific order or hierarchy of steps in the processes disclosed may be an example of one, non-limiting approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. In an aspect, for instance, a storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of performing configuration procedures for communication, comprising:

receiving, by a small cell access point, a first set of selectable first parameter values for a first radio access technology (RAT) transmission-related parameter for a first RAT entity and a second set of selectable second parameter values for a second RAT transmission-related parameter for a second RAT entity;

selecting, by the small cell access point, a first parameter value from the first set of selectable first parameter values and a second parameter value from the second set of selectable second parameter values based at least in part on a mapping function that maps between ones of the first set of selectable first parameter values for the first RAT transmission-related parameter and the second set of selectable second parameter values for the second RAT transmission-related parameter, wherein the selecting comprises:

generating a random value within a defined range, determining a parameter index value for selecting the first parameter value or the second parameter value based on a function of the random value, and selecting a remaining one of the first parameter value or the second parameter value based on the parameter index value and the mapping function; and communicating, by the small cell access point, using at least one of the first parameter value of the first RAT transmission-related parameter for the first RAT and the second parameter value of the second RAT transmission-related parameter for the second RAT.

2. The method of claim 1, wherein the defined range is between "1" and a value greater than "1".

3. The method of claim 1, further comprising performing one or more conflict detection procedures to detect a conflict with respect to one or both of the first parameter value for the first RAT transmission-related parameter and the second parameter value for the second RAT transmission-related parameter.

4. The method of claim 3, wherein performing one or more conflict detection procedures comprises:

performing one or both of a first RAT transmission-related parameter conflict detection procedure and a second RAT transmission-related parameter conflict detection procedure;

detecting at least one conflict condition based on the performing of at least one of the first RAT transmission-related parameter conflict detection procedure and the second RAT transmission-related parameter conflict detection procedure;

obtaining an updated parameter value for at least one of the first RAT transmission-related parameter and the second RAT transmission-related parameter; and setting the parameter value for one or both of the first RAT transmission-related parameter and the second RAT transmission-related parameter using the updated parameter value.

5. The method of claim 3, wherein performing one or more conflict detection procedures comprises:

detecting a conflict triggering condition;

performing one or both of the first RAT transmission-related parameter conflict detection procedure and the second RAT transmission-related parameter conflict detection procedure;

detecting at least one conflict condition based on the performing of at least one of the first RAT transmission-related parameter conflict detection procedure and the second RAT transmission-related parameter conflict detection procedure; and obtaining a first updated first parameter value for the first RAT transmission-related parameter in response to detecting at least one conflict condition.

6. The method of claim 5, further comprising:
obtaining a second updated first parameter value for the first RAT transmission-related parameter in response to detecting at least one conflict condition with respect to the first updated first parameter value;
preserving the first parameter value for the first RAT transmission-related parameter when the first updated first parameter value and the second updated first parameter value conflicts with the first parameter value for the first RAT transmission-related parameter;
determining an index value for the second RAT transmission-related parameter as a function of an updated parameter index value; and
selecting a new second parameter value for the second RAT transmission-related parameter from the second set of second selectable parameter values based at least on the index value for the second RAT transmission-related parameter.

7. The method of claim 3, wherein performing one or more conflict detection procedures comprises:
detecting a conflict triggering condition;
performing one or both of the first RAT transmission-related parameter conflict detection procedure and the second RAT transmission-related parameter conflict detection procedure;
detecting at least one conflict condition based on the performing of at least one of the first RAT transmission-related parameter conflict detection procedure and the second RAT transmission-related parameter conflict detection procedure; and
obtaining a first updated second parameter value for the second RAT transmission-related parameter in response to detecting at least one conflict condition.

8. The method of claim 7, further comprising:
obtaining a second updated second parameter value for the second RAT transmission-related parameter in response to detecting at least one conflict condition with respect to the first updated second parameter value;
preserving the second parameter value for the second RAT transmission-related parameter when the first updated second parameter value and the second updated second parameter value conflicts with the second parameter value for the second RAT transmission-related parameter;
determining an updated parameter index value for the first RAT transmission-related parameter as a function of an index value for the second RAT transmission-related parameter; and
selecting a new first parameter for the first RAT transmission-related parameter from the first set of first selectable parameter values based at least on the updated parameter index value for the first RAT transmission-related parameter.

9. A non-transitory computer-readable medium, comprising instructions for causing a computer of a small cell access point, when performing configuration procedures, to:
receive a first set of selectable first parameter values for a first radio access technology (RAT) transmission-related parameter for a first RAT entity and a second set of selectable second parameter values for a second RAT transmission-related parameter for a second RAT entity;
select a first parameter value from the first set of selectable first parameter values and a second parameter value from the second set of selectable second parameter values based at least in part on a mapping function that maps between ones of the first set of selectable first parameter values for the first RAT transmission-related parameter and the second set of selectable second parameter values for the second RAT transmission-related parameter, wherein to select the instructions cause the computer to:
generate a random value within a defined range,
determine a parameter index value for selecting the first parameter value or the second parameter value based on a function of the random value, and
select a remaining one of the first parameter value or the second parameter value based on the parameter index value and the mapping function; and
communicate using at least one of the first parameter value of the first RAT transmission-related parameter for the first RAT and the second parameter value of the second RAT transmission-related parameter for the second RAT.

10. An apparatus of a small cell access point for performing configuration procedures, the apparatus comprising:
means for receiving a first set of selectable first parameter values for a first radio access technology (RAT) transmission-related parameter for a first RAT entity and a second set of selectable second parameter values for a second RAT transmission-related parameter for a second RAT entity;
means for selecting a first parameter value from the first set of selectable first parameter values and a second parameter value from the second set of selectable second parameter values based at least in part on a mapping function that maps between ones of the first set of selectable first parameter values for the first RAT transmission-related parameter and the second set of selectable second parameter values for the second RAT transmission-related parameter, wherein the means for selecting comprises:
means for generating a random value within a defined range,
means for determining a parameter index value for selecting the first parameter value or the second parameter value based on a function of the random value, and
means for selecting a remaining one of the first parameter value or the second parameter value based on the parameter index value and the mapping function; and
means for communicating using at least one of the first parameter value of the first RAT transmission-related parameter for the first RAT and the second parameter value of the second RAT transmission-related parameter for the second RAT.

11. An apparatus of a small cell access point for performing configuration procedures, the apparatus comprising:
a memory storing executable instructions; and
a processor coupled to the memory, wherein the processor is configured to execute the instructions to:
receive a first set of selectable first parameter values for a first radio access technology (RAT) transmission-related parameter for a first RAT entity and a second set of selectable second parameter values for a second RAT transmission-related parameter for a second RAT entity;
select a first parameter value from the first set of selectable first parameter values and a second parameter value from the second set of selectable second parameter values based at least in part on a mapping function that maps between ones of the first set of selectable first parameter values for the first RAT transmission-related parameter and the second set of selectable second parameter values for the second RAT transmission-related parameter, wherein to select the processor is further configured to execute the instructions to:
generate a random value within a defined range,
determine a parameter index value for selecting the first parameter value or the second parameter value based on a function of the random value, and
select a remaining one of the first parameter value or the second parameter value based on the parameter index value and the mapping function; and
communicate using at least one of the first parameter value of the first RAT transmission-related parameter for the first RAT and the second parameter value of the second RAT transmission-related parameter for the second RAT.

12. The apparatus of claim 11, wherein the defined range is between "1" and a value greater than "1".

13. The apparatus of claim 11, wherein the processor is further configured to execute the instructions to perform one or more conflict detection procedures to detect a conflict with respect to at least one of the first parameter value for the first RAT transmission-related parameter or the second parameter value for the second RAT transmission-related parameter.

14. The apparatus of claim 13, wherein to perform one or more conflict detection procedures the processor is further configured to execute the instructions to:
perform one or both of a first RAT transmission-related parameter conflict detection procedure and a second RAT transmission-related parameter conflict detection procedure;
detect at least one conflict condition based on the performing of at least one of the first RAT transmission-related parameter conflict detection procedure and the second RAT transmission-related parameter conflict detection procedure;
obtain an updated parameter value for at least one of the first RAT transmission-related parameter and the second RAT transmission-related parameter; and
set the parameter value for one or both of the first RAT transmission-related parameter and the second RAT transmission-related parameter using the updated parameter value.

15. The apparatus of claim 13, wherein to perform one or more conflict detection procedures the processor is further configured to execute the instructions to:
detect a conflict triggering condition;
perform one or both of the first RAT transmission-related parameter conflict detection procedure and the second RAT transmission-related parameter conflict detection procedure;
detect at least one conflict condition based on the performing of at least one of the first RAT transmission-related parameter conflict detection procedure and the second RAT transmission-related parameter conflict detection procedure; and
obtain a first updated first parameter value for the first RAT transmission-related parameter in response to detecting at least one conflict condition.

16. The apparatus of claim 15, wherein the processor is further configured to execute the instructions to:
obtain a second updated first parameter value for the first RAT transmission-related parameter in response to detecting at least one conflict condition with respect to the first updated first parameter value;
preserve the first parameter value for the first RAT transmission-related parameter when the first updated first parameter value and the second updated first parameter value conflicts with the first parameter value for the first RAT transmission-related parameter;
determine an index value for the second RAT transmission-related parameter as a function of an updated parameter index value; and
select a new second parameter value for the second RAT transmission-related parameter from the second set of second selectable parameter values based at least on the index value for the second RAT transmission-related parameter.

17. The apparatus of claim 13, wherein to perform one or more conflict detection procedures the processor is further configured to execute the instructions to:
detect a conflict triggering condition;
perform one or both of the first RAT transmission-related parameter conflict detection procedure and the second RAT transmission-related parameter conflict detection procedure;
detect at least one conflict condition based on the performing of at least one of the first RAT transmission-related parameter conflict detection procedure and the second RAT transmission-related parameter conflict detection procedure; and
obtain a first updated second parameter value for the second RAT transmission-related parameter in response to detecting at least one conflict condition.

18. The apparatus of claim 17, wherein the processor is further configured to execute the instructions to:
obtain a second updated second parameter value for the second RAT transmission-related parameter in response to detecting at least one conflict condition with respect to the first updated second parameter value;
preserve the second parameter value for the second RAT transmission-related parameter when the first updated second parameter value and the second updated second parameter value conflicts with the second parameter value for the second RAT transmission-related parameter;
determine an updated parameter index value for the first RAT transmission-related parameter as a function of an index value for the second RAT transmission-related parameter; and
select a new first parameter for the first RAT transmission-related parameter from the first set of first selectable parameter values based at least on the updated parameter index value for the first RAT transmission-related parameter.

* * * * *